Sept. 27, 1938.                M. DE LIN                 2,131,552
                          JOINT CONSTRUCTION
                           Filed July 12, 1937

INVENTOR
Martin DeLin.
BY
Carroll R. Taber
ATTORNEY

Patented Sept. 27, 1938

2,131,552

UNITED STATES PATENT OFFICE 2,131,552

JOINT CONSTRUCTION

Martin De Lin, Holland, Mich., assignor to Holland Furnace Company, Holland, Mich., a corporation of Michigan Application July 12, 1937, Serial No. 153,099

1 Claim. (Cl. 285—134)

This invention relates to joint constructions, and more particularly to maintaining a proper seal in the joint regardless of relative expansions and contractions of the two members forming the joint. The joint is especially applicable for use in furnace constructions where varying temperatures occur and where the plane of the joint is vertical rather than horizontal.

Briefly, the invention consists in providing a sealing element for a joint which consists of a flexible core surrounded by adhesive material, and placing the sealing element in the joint in such manner that it cannot escape in either direction. The adhesive material adheres to the flexible core and to the adjacent walls of the joint. The flexible core permits expansion and contraction of the two members of the joint without destroying the seal between the members.

The invention is herein shown as embodied in a joint consisting of a pair of tubular members secured to each other in longitudinal alignment. In the drawing.

Figure 1:
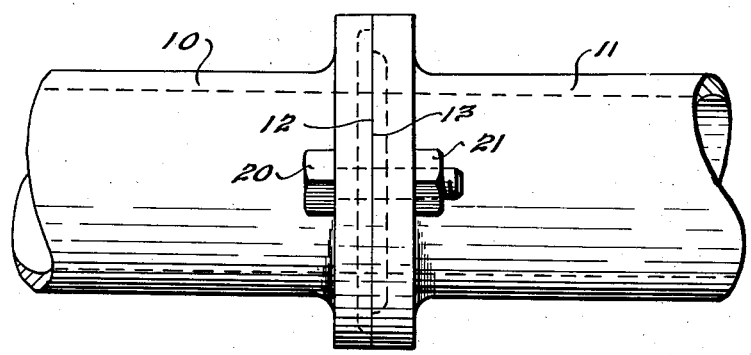
Figure 1 is a side view in elevation of the joint construction.

The construction shown in the drawing consists of a pair of tubular members 10 and 11 having cooperating generally radially extending flanges having faces 12 and 13 respectively.

The radially extending flange face 12 is provided with a chamfered rib 14 at its radially inner extremity. An axially extending groove 15 is formed in the face 12 alongside the base of rib 14. The radially extending flange face 13 of member 11 is cut away at its radially inner edge to provide a recess 16 complemental to the rib 14. Radially outwardly of the recess 16, the face 13 is provided with a shallow groove 17 of less extent radially and axially than groove 15 and adapted to register with the radially outer portion of groove 15.

The radial faces 12 and 13 of the radial flanges of members 10 and 11 are preferably formed with cooperating radial projections at their peripheries in which aligned openings 18 and 19 are formed. These openings are adapted to receive clamping means in the form of stud bolts 20 and nuts 21.

In assembling the joint the groove 15 formed in face 12 is filled with packing, comprising a flexible core 22, preferably in the form of asbestos wicking, which is surrounded by a thin layer of adhesive material 23, preferably consisting of furnace cement.

Figure 2:
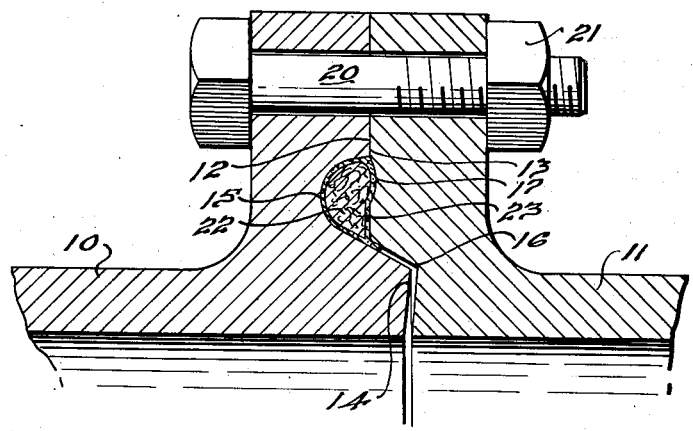
Figure 2 is a partial sectional view through the joint showing the clamping means.
Figure 3:
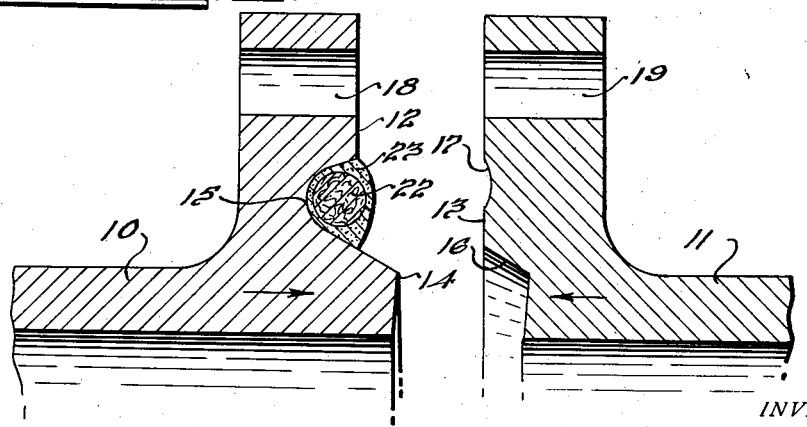
Figure 3 is an exploded view of the construction shown in Figure 2 with the clamping means removed.

When the two tubular members are clamped together, as illustrated in Figure 2, the packing is distorted as shown in that figure, and completely fills both the groove 15 and the groove 17. The adhesive material 23 adheres to the flexible core 22 and to the walls of both grooves 15 and 17. The flexible core 23 is itself a seal. Therefore, even though the adhesive material 22 may become cracked due to relative expansion of the members 10 and 11, an effective seal is maintained at the joint by the core 23.

With the joint in the assembled relation shown in Figure 2, the interlocking relation between rib 14 and the recess 16 effectively prevents the escape of the packing through the radially inner periphery of the joint. Likewise, the clamping effect of the studs 20 and nuts 21 prevents the escape of the packing through the radially outer extremity of the joint. An effective seal is maintained at the joint regardless of expansion due to heat changes, by reason of the flexible nature of the core 22, which may be distorted without breaking the seal.

From the foregoing description it will be apparent that the present invention provides a construction which is suitable for use in joints having a vertical plane, and which maintains an effective seal, irrespective of changes in temperature.

The scope of the invention is indicated in the appended claim.

I claim:

A joint construction comprising a pair of cooperating flanges, one flange having a chamfered portion at one edge thereof and a groove formed in that flange alongside the base of the flange, the other flange being rabbeted to receive the said chamfered portion and provided with a groove remote from said rabbeted portion, said last-mentioned groove being of less extent radially and axially than the groove in said first-mentioned flange and registering with the radially outer portion of the groove in the first mentioned flange, said grooves being filled with packing material comprising a flexible fibrous core surrounded by adhesive material, and means for clamping the two flanges together with the packing material completely filling the grooves in both flanges.

MARTIN DE LIN.